(No Model.)

F. SILLIMAN, Jr., & W. H. COWDERY.
FORK BLANK.

No. 406,480. Patented July 9, 1889.

Witnesses
C. B. Nash.
E. J. Clime.

Inventors
Frank Silliman, Jr. and
W. H. Cowdery
By their Attorney
Thos. D. Hall

UNITED STATES PATENT OFFICE.

FRANK SILLIMAN, JR., OF SPRINGFIELD, MASSACHUSETTS, AND WARREN H. COWDERY, OF ASHTABULA, OHIO; SAID SILLIMAN ASSIGNOR TO SAMUEL R. HARRIS, OF ASHTABULA, OHIO.

FORK-BLANK.

SPECIFICATION forming part of Letters Patent No. 406,480, dated July 9, 1889.

Application filed August 29, 1887. Renewed March 22, 1889. Serial No. 304,339. (No model.)

*To all whom it may concern:*

Be it known that we, FRANK SILLIMAN, Jr., a citizen of the United States, and a resident of Springfield, county of Hampden and State of Massachusets, and WARREN H. COWDERY, a citizen of the United States, and a resident of Ashtabula, county of Ashtabula, and State of Ohio, have invented certain new and useful Improvements in Fork-Blanks, of which the following is a specification.

The principle of the invention is herein explained, and the best mode in which we have contemplated applying that principle so as to distinguish it from other inventions.

The object of the invention is to produce a form of fork-blank, such that the entire blank-bar shall be practically used and there shall be no waste in the manufacture of duplicate fork-blanks.

To such end our invention consists, first, of a fork-blank having an outer tine portion and an inner tine portion formed parallel, and having an outer tine portion and a tang portion formed parallel, but projecting in an opposite direction from said first two portions; second, of a fork-blank having a tine portion and a tang portion formed in substantially parallel lines, and having two other tine portions formed in substantially parallel lines with each other and projecting from the blank-head in an opposite direction from said first two portions, said two other tine portions being separated from each other throughout their entire length a distance substantially equal in width to the width of the tang portion.

Figure 1:
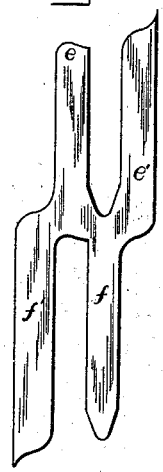
Figure 2:
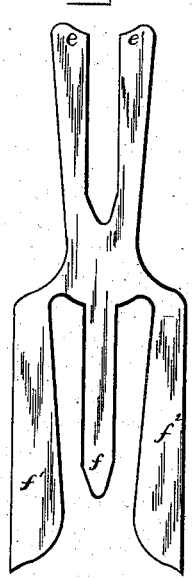
Figure 3:
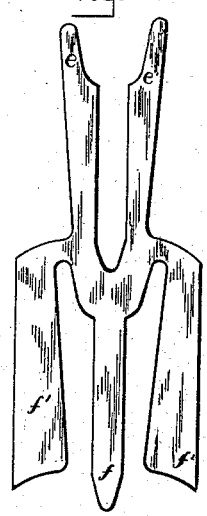
Figure 4:
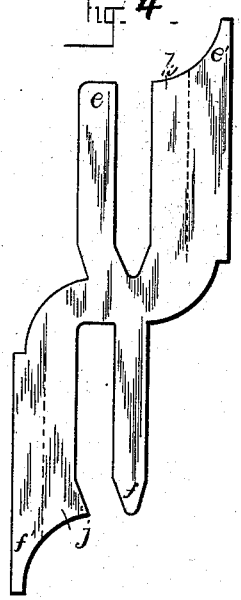
Figure 5:
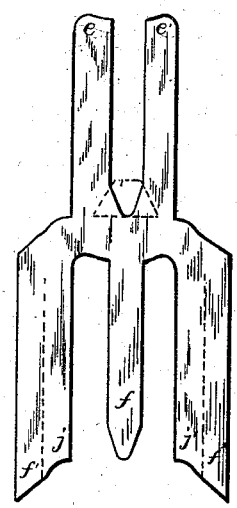

Referring to the drawings, Figure 1 is a plan view of a blank for a three-tined fork. Figs. 2 and 3 are plan views of blanks for four-tined forks. Fig. 4 is a plan view of a blank for a five-tined fork. Fig. 5 is a plan view of a blank for a six-tined fork.

The fork-blanks respectively shown in Figs. 1 and 4 each has an outer tine portion $e'$ and an inner tine portion $e$ formed parallel, and has an outer tine portion $f'$ and a tang portion $f$ formed parallel, but projecting in an opposite direction from the first two portions $e$ and $e'$; but the fork-blanks in said Figs. 1 and 4, together with the other forms, respectively shown in Figs. 2, 3, and 5, each and all these various fork-blanks are formed according to the same principle. Each has a tine portion $f'$ and a tang portion $f$ formed in substantially parallel lines, and also has two other tine portions $e$ and $e'$ formed in substantially parallel lines with each other and projecting from the blank-head in an opposite direction from said first two portions $f'$ and $f$, said two other tine portions $e$ and $e'$ being separated from each other throughout their entire length a distance substantially equal in width to the width of the tang portion $f$. Each form of fork-blank is of shape such that in stamping or cutting duplicates of the same from a bar of metal of the width of the blank the said blank-forming process may be carried on without waste of material. The formation of each transverse half of any one form of said fork-blanks of necessity results in the formation of the corresponding opposite transverse half of a duplicate fork-blank. The method of cutting or stamping out duplicate fork-blanks is thus quickly and economically carried on.

In any suitable instance a tine portion may be longitudinally divided or slitted, so as to make more than one tine from such tine portion as the fork-blank is originally formed. Illustration of such modification appears respectively in the last two figures of the drawings. In Fig. 4 the outer tine portion $e'$, which projects from the blank-head in an opposite direction from the tang portion $f$, is to be divided, as indicated by dotted lines, so as to eventually form an additional tine portion $k$ therefrom. So in like manner the tine portion $f'$ of the same figure is to have an additional tine portion $j$ made therefrom.

In the blank shown in Fig. 5, the tine portion $f'$ is to have an added tine portion $j$ made therefrom, and tine portion $f^2$ is to have an added tine portion $j'$ made therefrom. Any certain fork-blank is to be perfected into a fork having as many tines as the blank eventually has tine portions. In using the phrase "tine portion" in the claims we therefore mean a portion which may eventually be worked into one or more tines.

When the fork-blanks are eventually formed, the tine portions are properly worked into tines, the tine portions which project from the blank head in same direction with the tang portion being first bent outward and in reverse direction, so as to be parallel with tine portions e and e'. In any instance desired the blank may be bent so as to bring the tang portion in desired position, and such tang portion may be suitably worked into a tang.

In an application for United States Letters Patent filed August 30, 1888, we claim the method of forming these fork-blanks, and rest such claim with said application.

The foregoing description and accompanying drawings set forth in detail forms in embodiment of our invention. Change may be made therein, provided the principles of formation respectively recited in the following claims are employed.

We therefore particularly point out and distinctly claim as our invention—

1. A fork-blank having a tine portion and a tang portion formed in substantially parallel lines, and having two other tine portions formed in substantially parallel lines with each other and projecting from the blank-head in an opposite direction from said first two portions, said two other tine portions being separated from each other throughout their entire length a distance substantially equal in width to the width of the tang portion, substantially as set forth.

2. A fork-blank having an outer tine portion and an inner tine portion formed parallel, and having an outer tine portion and a tang portion formed parallel but projecting in an opposite direction from the first two portions, substantially as set forth.

In testimony that we claim the foregoing to be our invention we have hereunto set our hands this 3d day of August, A. D. 1887.

FRANK SILLIMAN, JR.
WARREN H. COWDERY.

Witnesses:
J. B. FAY,
E. J. CLIMO.